United States Patent [19]
Benzschawel

[11] Patent Number: 5,931,085
[45] Date of Patent: Aug. 3, 1999

[54] PORTABLE ADJUSTABLE GRILL APPARATUS

[75] Inventor: Thomas R. Benzschawel, Cascade, Wis.

[73] Assignee: Grate Mate Corporation, Kewaskum, Wis.

[21] Appl. No.: 08/932,470

[22] Filed: Sep. 18, 1997

[51] Int. Cl.[6] .............................. A47J 37/00; A47J 37/07
[52] U.S. Cl. ........................... 99/449; 99/450; 126/25 A; 126/30; 126/9 R
[58] Field of Search .............................. 99/339, 340, 419, 99/421 R, 446–450, 482; 126/25 R, 25 A, 30, 29, 9 R, 9 B, 25 AA; 248/165, 168, 170, 163.2

[56] References Cited

U.S. PATENT DOCUMENTS

| | | | |
|---|---|---|---|
| 192,011 | 6/1877 | Richardson | 126/30 |
| 2,631,579 | 3/1953 | Metzger | 99/450 X |
| 3,040,651 | 6/1962 | Nolte, Jr. | 99/446 |
| 3,094,113 | 6/1963 | Avila | 126/30 |
| 3,837,328 | 9/1974 | Schaffer | 126/29 |
| 3,905,286 | 9/1975 | Le Grady | 126/25 R |
| 4,109,567 | 8/1978 | Gage et al. | 99/450 |
| 4,120,280 | 10/1978 | Iverson et al. | 126/30 |
| 4,146,010 | 3/1979 | Manska | 126/30 |
| 4,269,164 | 5/1981 | Van Grinsven et al. | 126/30 |
| 4,393,857 | 7/1983 | Sanford | 126/9 R |
| 4,622,945 | 11/1986 | Glitten | 126/25 |
| 4,867,130 | 9/1989 | Walker | 126/25 |
| 5,025,715 | 6/1991 | Sir | 99/449 X |
| 5,297,534 | 3/1994 | Louden | 126/30 |
| 5,317,961 | 6/1994 | Shinler | 99/449 |
| 5,406,931 | 4/1995 | Montgomery | 126/30 |

Primary Examiner—Timothy F. Simone
Attorney, Agent, or Firm—Michael Best & Friedrich LLP

[57] ABSTRACT

A portable, adjustable grill apparatus for cooking over a source of heat, including at least three grill legs having respective upper ends and lower ends, the grill legs being interconnected at the upper ends and angularly spaced relative to each other, and the lower ends being adapted to rest on the ground. A grill extends generally horizontally and has a perimeter connected to the grill legs for sliding movement therealong. A height adjusting mechanism selectively adjusts the height of the grill relative to the legs. The height adjustment mechanism includes a plurality of flexible members that are each routed inside an interior passage of a respective one of the grill legs, the flexible members having inner ends connected to the grill and outer ends connected to a securing member.

23 Claims, 4 Drawing Sheets

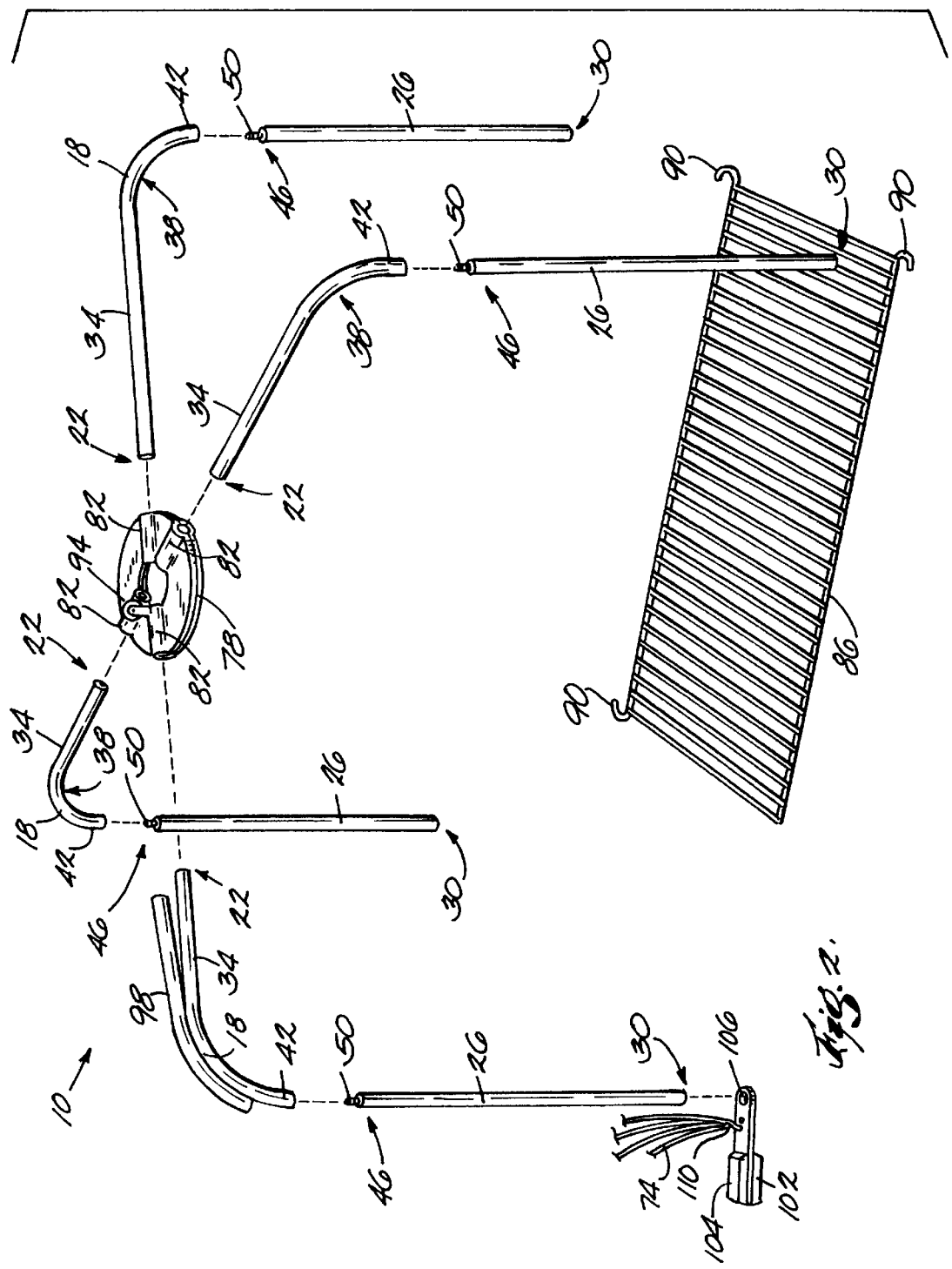

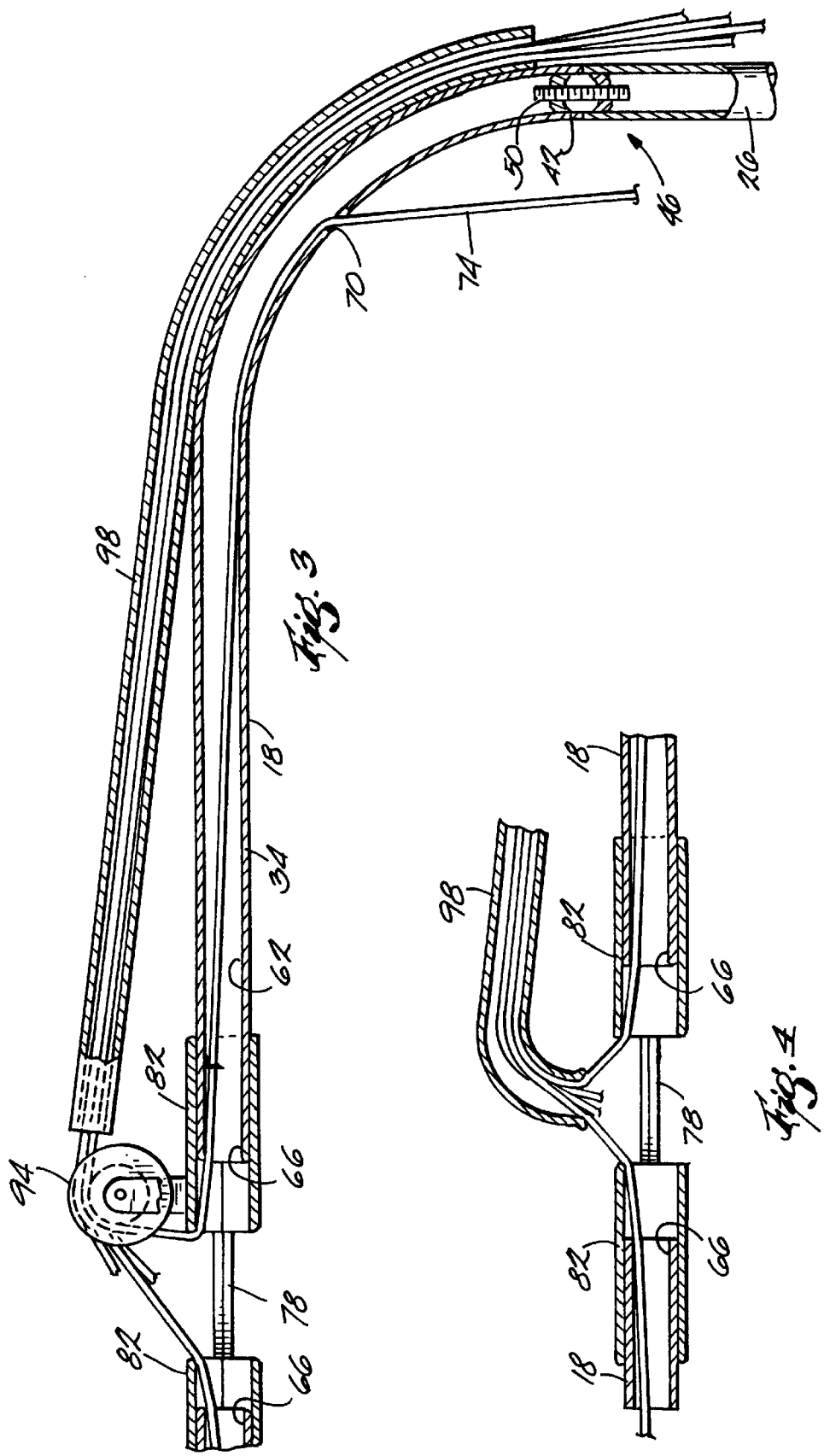

PORTABLE ADJUSTABLE GRILL APPARATUS

BACKGROUND OF THE INVENTION

1. Field of the Invention

The invention relates to portable grills.

2. Description of the Prior Art

Cooking over an open source of heat, such as a campfire, is a well known and popular method of preparing food. In some situations, such as when camping, it is necessary that the grill be made portable so as to be conveniently carried and set up at a remote location. Such portable grills are known, and may consist of, for example, a tripod having a grill suspended by a chain from the center of the tripod. Further, it is known that having a grill structure that provides adjustable grill height relative to the legs or structure of the grill is a useful feature. However, present portable grills are not as convenient to use or sturdy as home grills and may not be sufficiently portable to be easily carried.

SUMMARY OF THE INVENTION

The present invention provides a portable adjustable grill apparatus that is readably collapsed to a compact configuration and is sturdy and functional for grilling.

More specifically, the invention provides a portable, adjustable grill apparatus for cooking over a source of heat. The grill apparatus comprises at least three grill legs having respective upper ends and lower ends. The grill legs are interconnected at the upper ends and angularly spaced relative to each other, and the lower ends are adapted to rest on the ground. The grill apparatus also includes a grill extending generally horizontally and having a perimeter connected to the grill legs for sliding movement therealong, and a height adjusting mechanism for selectively adjusting the height of the grill relative to the legs.

Such a structure provides a sturdy, yet collapsible and thereby easily portable configuration. Further, providing a grill that extends between the grill legs and is connected to the grill legs maximizes the grilling area available, and helps to provide a sturdy structure. The height adjusting mechanism allows the grill to be used over various types of heat sources, and also permits the adjustment of the distance between the grill and the heat while cooking to control the cooking rate.

In a preferred embodiment, the grill apparatus has four legs and further comprises a central hub connected to the upper ends of the grill legs such that the grill legs are angularly spaced relative to each other about the central hub. Also, the grill legs preferably include upper leg portions and lower leg portions that are removably connected to each other. The grill apparatus preferably also includes a plurality of collars connected to the perimeter of the grill, each of the collars being mounted to a respective one of the grill legs for sliding movement therealong.

The invention also provides a portable, adjustable grill apparatus comprising a plurality of grill legs including respective interior passages, a grill extending generally horizontally, and a height adjusting mechanism for selectively adjusting the height of the grill relative to the legs. The height adjusting mechanism includes a plurality of flexible members that are each routed inside the interior passage of a respective grill leg, the flexible members having respective inner ends connected to the grill.

The grill apparatus preferably further includes a cable guide fixed to one of the grill legs, and the flexible members are connected to the perimeter of the grill and extend upward from the grill, through respective interior passages, over the pulley, and through the cable guide.

The grill apparatus preferably further comprises a securing device connected to the outer ends of the flexible members for securing the outer ends to one of the legs at selected securing points therealong to secure the grill at a selected height relative to the grill legs. The height adjusting mechanism is configured such that moving the securing device downward pulls the grill upward along the grill legs via the flexible members.

Other features and advantages of the invention will become apparent to those skilled in the art upon review of the following detailed description, claims and drawings.

BRIEF DESCRIPTION OF THE DRAWINGS

FIG. 2 is an exploded perspective view of the grill apparatus.

FIG. 3 is a cross-section of an upper portion of the grill, including a height adjustment mechanism.

FIG. 4 is a cross-section, similar to FIG. 3 but showing an alternative embodiment not using a pulley.

Figure 1:
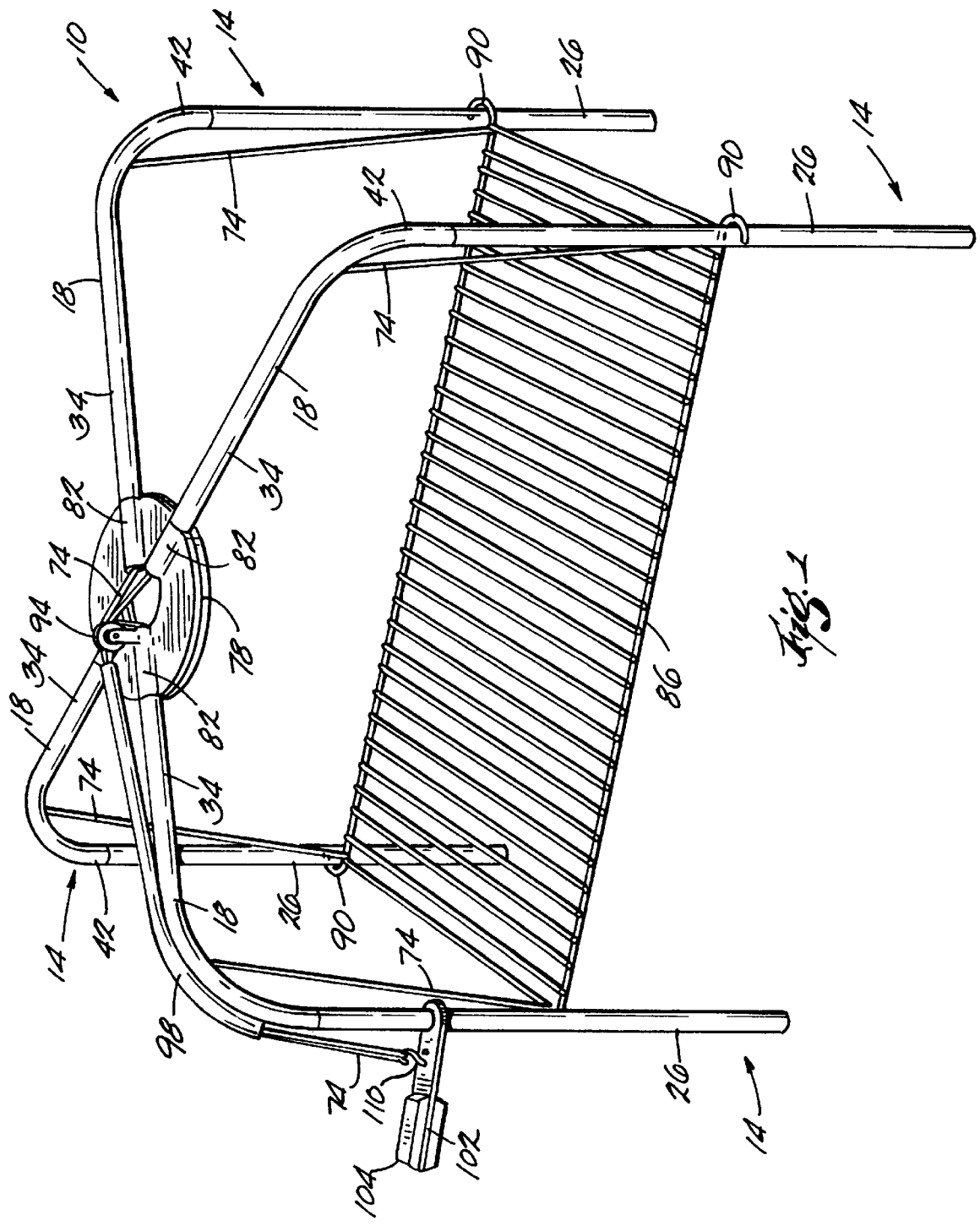
FIG. 1 is a perspective view of an adjustable grill apparatus embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

FIGS. 1 and 2 show a portable, adjustable grill apparatus 10 embodying the invention. The grill apparatus 10 includes four substantially identical grill legs 14 that are angularly spaced relative to each other and are interconnected at the top and rest on the ground at the bottom. The grill legs 14 define a rectangular area or footprint that the grill apparatus 10 covers on the ground. It is preferable to provide at least three grill legs 14. More grill legs provide additional stability. In the preferred embodiment, the legs 14 are formed of steel for economy and strength, and covered by a durable surface coating, such as powder coat or chrome. The grill legs may also be constructed of aluminum, for example, for lighter weight.

The grill legs 14 are each comprised of an upper leg portion 18 including an upper end 22, and a lower leg portion 26 including a lower end 30. The leg portions 18 and 26 are preferably tubular. Further, each upper leg portion 18 is comprised of a generally horizontal segment 34 that extends radially from the upper end 22 to an outer end 38, and a generally vertically extending segment 42 that extends downwardly from the outer end 38 of the horizontal segment 34. The lower leg portions 26 extend generally vertically and each has upper end that removably connects to a respective upper leg portion 18.

Figure 5:
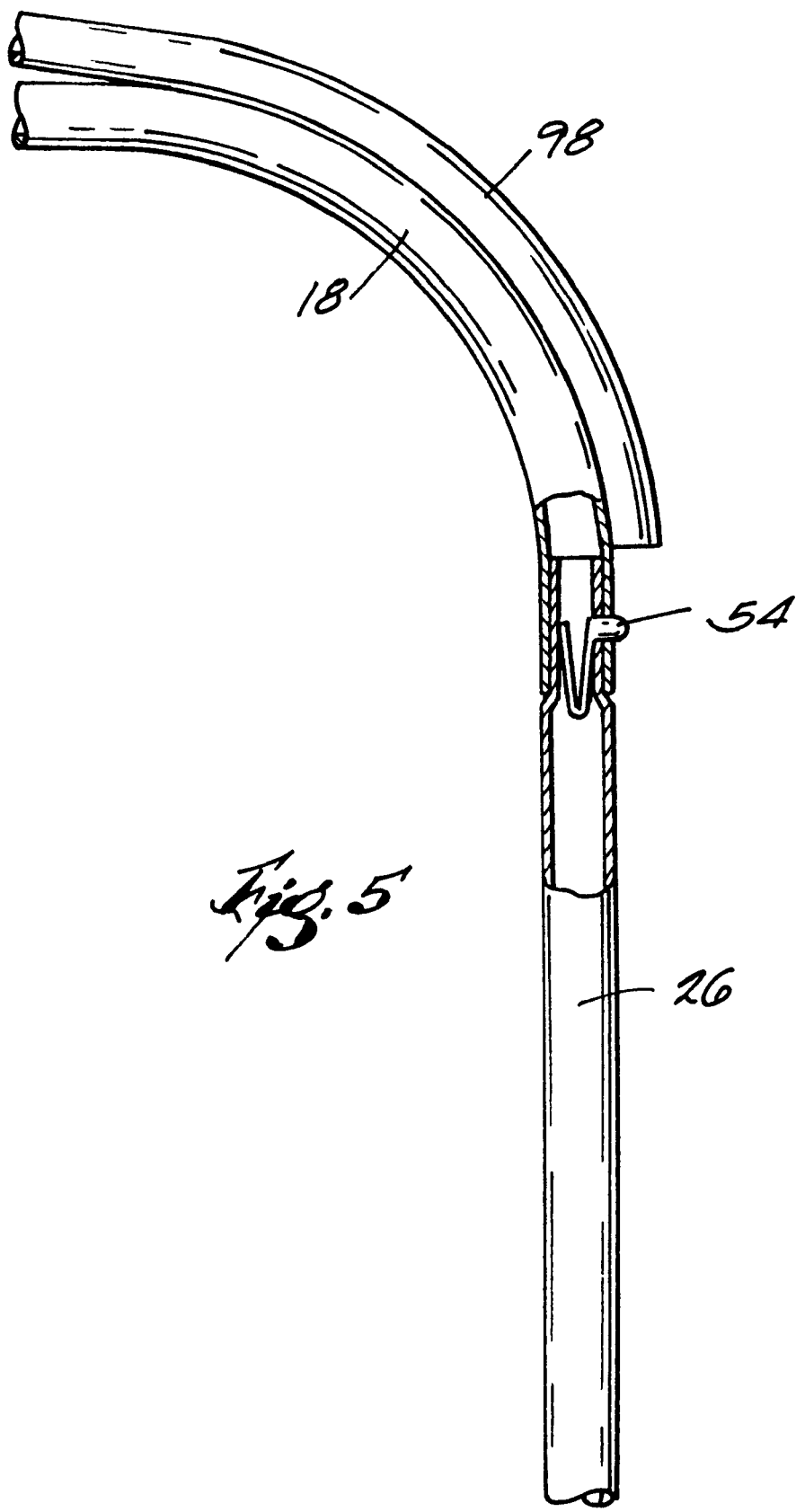
FIG. 5 is a cross-section, similar to a portion of FIG. 3 but showing an alternative connection of the upper and lower leg portions.

The upper leg portions 18 and lower leg portions 26 are removably connected (see FIGS. 2 and 3) by means of a fastener 46 that connects internally. In the construction illustrated in FIGS. 2 and 3, the fastener 46 includes a threaded bolt 50 that is fixed in the lower leg portion 26 and screws into the upper leg portion 18. In the alternative construction illustrated in FIG. 5, the fastener 46 includes a telescoping connection of the leg portions with a snap button 54 on one leg portion (the lower leg portion 18 in FIG. 5) and, in the other leg portion (the upper leg portion 26 in FIG. 5), an aperture through which the snap button 54 extends. This construction is well known in the art. In either case, the grill apparatus 10 may be quickly and easily taken apart for transportation or storage, and tightly and solidly reconnected without the use of tools.

The leg portions 18 and 26 define (see FIG. 3) respective interior passages 62. As shown in cross section in FIGS. 3 and 4, each upper leg portion 18 includes a first opening 66 adjacent the upper end. The first opening 66 is preferably the open end of the tube. A second opening 70 (see FIG. 3) is formed in the upper leg portion 18 near the outer end of the horizontal segment 34, adjacent the junction of the horizontal and vertical segments 34 and 42. The second opening 70 faces downward and is sized to accommodate a flexible member 74, as described hereinafter in further detail.

In the illustrated embodiment, the grill legs 14 are joined at their upper ends by a central hub 78 such that the grill legs are angularly spaced relative to each other about the central hub 78. The central hub 78 is essentially disc-shaped with a central opening. As illustrated, the central hub 78 may simply be formed of one or two sheets of metal that are formed and joined together, such as by welding. Four cylindrical sleeves 82 are formed into the central hub 78 to receive the upper leg portions 18. The upper portions 18 of the grill legs may be permanently connected to the central hub 78, such as by welding, or removably connected to the central hub 78, such as by an interference fit.

The apparatus 10 also comprises a grill 86 that extends generally horizontally, is rectangular in shape and mounts to the lower leg portions 26 of the grill legs for sliding movement along and relative to the grill legs 14. The grill 86 includes collars or hooks 90 mounted on the perimeter of the grill 86, preferably at three of the four corners (the reason for having collars 90 at only three corners is explained below). Each of the collars 90 is positioned around at least a portion of a respective grill leg 14 to fix the horizontal position of the grill 86 relative to the grill legs. As shown, the collars 90 do not go completely around the grill legs so that the grill apparatus 10 is easily collapsible. For a more rigid connection, a cylindrical sleeve may be used as a collar.

The grill apparatus 10 also comprises a height adjusting mechanism for selectively adjusting the height of the grill 86 relative to the legs 14. The height adjusting mechanism includes four flexible members 74 that attach to the perimeter of the grill 86 adjacent to the legs 14. The flexible members 74 are preferably aircraft cables, but may also be chains or ropes. The height adjusting mechanism also includes a pulley 94 mounted on the central hub 78, and a cable guide 98 mounted on one of the legs 14. The cable guide 98 is a hollow tube, similar to the grill legs, and may be made of, for example, steel. The tube 98 is preferably welded to the associated grill leg 14. As shown, the cable guide 98 is attached to the upper leg portion 18 near the outer end of the upper leg portion and raised off the grill leg toward the upper end. In an alternative embodiment, shown in FIG. 4, the upper end of the cable guide tube 98 is turned downward and the pulley 94 is eliminated.

As shown in cross section in FIG. 3, each cable 74 is routed from the grill 86 through the second opening 70 in the upper leg portion. Each cable 74 runs inside the interior passage 62 of the respective leg 14 and then out of the interior passage 62 through the first opening 66. The four cables 74 converge as they pass over the pulley 94. The pulley 94 helps ease cable movement. The cables 74 then pass through the cable guide tube 98. Thus, each cable 74 runs up from the grill 86 generally along the respective grill leg 14. This configuration has a number of benefits. First, the cables 74 are routed in such a fashion that they do not obstruct access to the area over the grill 86. Additionally, the cables help to hold the grill 86 stable, much more so than if the cables were to converge toward the center of the grill 86. Also, the cables 74 are largely hidden.

As shown in FIGS. 1 and 2, the outer ends of the cables 74 are connected to a securing device 102. As shown, all four cables 74 run alongside each other. In another embodiment, the cables may be joined together at some point prior to connection to the securing device 102. The securing device 102 is essentially a flat plate with a handle 104 and a hole 106 (see FIG. 2) slightly larger that the diameter of the grill leg 14 to which the device 102 is attached, with the grill leg 14 extending through the hole 106. The device 102 is slidable along the grill leg when the device 102 is substantially perpendicular to the leg, but is not slidable along the leg, i.e., is substantially fixed relative to the leg, when the device 102 is cocked or non-perpendicular to the leg. The cables 74 attach to a hook 110 on the securing device 102, the hook 110 being offset from the grill leg. In this way, weight on the grill 86 causes the cables 74 to pull upward on the hook 110. This puts a torque on the securing device 102 that cocks the securing device 102 relative to the leg, thereby fixing the device 102 in place. The more weight placed on the grill 86, the tighter the securing device 102 is held in place. Also, the securing device 102 may be secured at an infinite number of securing points along the grill leg. The securing device 102 is released by uncocking the device 102 relative to the leg, and may be pulled downward to raise the grill 86 and moved upward to lower the grill 86. There is no collar 90 on the corner of the grill 86 adjacent the leg to which the device 102 is attached, so that the grill 86 can pass the device 102 as the grill is being raised and lowered.

If the upper leg portions 18 are permanently connected to the central hub 78, the central hub 78, the upper leg portions 18, the cable guide tube 98 and the pulley 94 define a top assembly of the grill apparatus 10. The grill apparatus 10 is still collapsible to a relatively convenient size for transporting. Essentially, the grill apparatus 10 collapses to a package about the size of the top assembly, i.e., as tall as the vertical segments 42 of the upper leg portions 18, and about as large in area as the grill 86 itself. The lower leg portions 26 may be sized such that they may be set within the area of the grill 86. For example, as illustrated, the lower leg portions are sized to be about as long as the diagonal across the grill 86. Therefore, when the grill apparatus 10 is collapsed, the lower leg portions 26 fit within a box that holds the rest of the grill apparatus 10. Because the grill 86 itself (as illustrated) cannot be folded or collapsed, this is nearly as compact as the entire grill apparatus 10 could otherwise be. In this way, the original box in which the grill apparatus 10 is sold may be used as a carrying case.

If it is desirable to collapse the grill apparatus 10 further, then the upper leg portions 18 could be made removable from the central hub 78, and the grill 86 itself could be made foldable or collapsible.

Various features of the invention are set forth in the following claims.

I claim:

1. A portable, adjustable grill apparatus for cooking over a source of heat, said grill apparatus comprising:
   at least three grill legs having respective upper ends and lower ends, said grill legs being interconnected at said upper ends and angularly spaced relative to each other, and said lower ends being adapted to rest on the ground;
   a grill extending generally horizontally and having a perimeter in direct contact with said grill legs for sliding movement therealong; and
   a height adjusting mechanism for selectively adjusting the height of said grill relative to said legs.

2. A grill apparatus according to claim 1, wherein said grill apparatus comprises four of said grill legs.

3. A grill apparatus according to claim 1, further comprising a central hub connected to said upper ends of said grill legs such that said grill legs are angularly spaced relative to each other about said central hub.

4. A grill apparatus according to claim 3, wherein said grill legs have respective upper leg portions and lower leg portions, wherein said upper leg portions have respective generally horizontal segments that extend radially from said central hub to respective outer ends, wherein said upper leg portions also have respective generally vertical segments that extend downwardly from respective outer ends of said horizontal segments, wherein said lower leg portions extend generally vertically and have respective upper ends each removably connected to a respective one of said vertical segments, and wherein said lower leg portions have respective lower ends adapted to rest on the ground.

5. A grill apparatus according to claim 1, wherein said grill includes a plurality of collars connected to said perimeter of said grill, each of said collars being mounted on a respective one of said grill legs for sliding movement therealong.

6. A portable, adjustable grill apparatus for cooking over a source of heat, said grill apparatus comprising:
   at least three grill legs having respective upper ends and lower ends, said grill legs being interconnected at said upper ends and angularly spaced relative to each other, and said lower ends being adapted to rest on the ground;
   a grill extending generally horizontally and having a perimeter connected directly to said grill legs for sliding movement therealong; and
   a height adjusting mechanism for selectively adjusting the height of said grill relative to said legs, wherein said height adjusting mechanism includes a plurality of flexible members that are each routed along a respective one of said grill legs, said flexible members having respective inner ends connected to said grill and having respective outer ends connected together.

7. A grill apparatus according to claim 1, wherein said legs have respective interior passages, and wherein said height adjusting mechanism includes a plurality of flexible members that are each routed inside the interior passage of a respective one of said grill legs, said flexible members having respective inner ends connected to said grill.

8. A grill apparatus according to claim 7, wherein said flexible members have respective outer ends, and further comprising a securing device connected to said outer ends of said flexible members for securing said outer ends to one of said legs at selected securing points therealong to secure said grill at a selected height relative to said grill legs.

9. A portable, adjustable grill apparatus for cooking over a source of heat, said grill apparatus comprising:
   a plurality of grill legs including respective interior passages;
   a grill extending generally horizontally; and
   a height adjusting mechanism for selectively adjusting the height of said grill relative to said legs, said height adjusting mechanism including a plurality of flexible members that are each routed inside the interior passage of a respective one of said grill legs, said flexible members having respective inner ends connected to said grill.

10. A grill apparatus according to claim 9, wherein said grill legs are tubular.

11. A grill apparatus according to claim 9, wherein each of said grill legs has an upper end and first and second openings joining the respective interior passage, said first opening being adjacent said upper end, and wherein the respective flexible member extends into the respective interior passage through said first opening and out of the respective interior passage through said second opening.

12. A grill apparatus according to claim 11, wherein each of said grill legs includes horizontal and vertical segments meeting at a junction, and wherein said second opening is located adjacent said junction.

13. A grill apparatus according to claim 11, further comprising a cable guide fixed to one of said grill legs, and a pulley fixed to said grill legs, wherein said grill includes a perimeter, and wherein said flexible members are connected to said perimeter of said grill and extend upward from said grill, through respective second openings, through respective interior passages, through respective first openings, over said pulley, and through said cable guide.

14. A grill apparatus according to claim 9, further comprising a cable guide fixed to one of said grill legs, wherein said flexible members are routed through said cable guide.

15. A grill apparatus according to claim 9, further comprising a pulley fixed to said grill legs, wherein said flexible members are routed over said pulley.

16. A grill apparatus according to claim 9, wherein said grill includes a perimeter, and wherein said flexible members are connected to said perimeter of said grill.

17. A grill apparatus according to claim 9, wherein said flexible members have respective outer ends, and further comprising a securing device connected to said outer ends of said flexible members for securing said outer ends to one of said legs at selected securing points therealong to secure said grill at a selected height relative to said grill legs.

18. A grill apparatus according to claim 17, wherein said height adjusting mechanism is configured such that moving said securing device downward pulls said grill upward along said grill legs via said flexible members.

19. A portable, adjustable grill apparatus for cooking over a source of heat, said grill apparatus comprising
   a top assembly including
      a central hub,
      first, second, third and fourth tubular upper leg portions extending radially from the central hub, the upper leg portions being angularly spaced relative to each other, each upper leg portion having a horizontal segment which extends generally horizontally from the hub and which has an outer end, each upper leg portion also having a vertical segment which extends generally vertically and downwardly from the outer end of the horizontal segment and which has a lower end, and each upper leg portion having therein a first opening adjacent the hub and a second opening adjacent the outer end of the horizontal segment, a cable guide tube fixed to the first upper leg portion, the cable guide tube having a horizontal segment which extends generally horizontally along the first upper leg portion, which has an inner end adjacent the hub, and which has an outer end, and the cable guide tube also having a vertical segment which extends generally vertically and downwardly from the outer end of the tube horizontal segment, and a pulley mounted on the hub, first, second, third and fourth lower leg portions respectively removably connected to the first, second, third and fourth upper leg portions, each of the lower leg portions extending generally vertically and having an upper end removably connected to the lower end of the vertical segment of the associated upper leg portion, and each of the lower leg portions having a lower end adapted to rest on the ground, a grill extending generally horizontally and having a perimeter, the perimeter having thereon first, second, third and fourth points respectively connected to the first, second, third and fourth lower leg portions for sliding movement therealong, first, second, third and fourth cables respectively associated with the first, second, third and fourth upper leg portions, each of the cables extending through the cable guide tube, over the pulley, into the first opening in the associated upper leg portion, through the associated upper leg portion to the second opening thereof, and out of the associated upper leg portion through the second opening, each of the cables having an inner end connected to the grill, the inner ends of the first, second, third and fourth cables being connected to the grill adjacent the first, second, third and fourth points, respectively, and each of the cables having an outer end, and a securing device connected to the outer ends of the first, second, third and fourth cables for releasably securing the outer ends of the cables to one of the lower leg portions at selected points therealong, such that moving the securing device downwardly pulls the cables, via the guide tube, the pulley and the upper leg portions, so as to move the grill upwardly along the lower leg portions, whereby the height of the grill is adjustable by adjusting the point at which the securing device is secured to the one of the lower leg portions.

20. A portable, adjustable grill apparatus for cooking over a source of heat, said grill apparatus comprising:

at least three grill legs having respective upper ends and lower ends, said grill legs being interconnected at said upper ends and angularly spaced relative to each other, and said lower ends being adapted to rest on the ground;

a grill extending generally horizontally and having a perimeter connected to said grill legs for sliding movement therealong; and a height adjusting mechanism for selectively adjusting the height of said grill relative to said legs, said height adjusting mechanism including a plurality of flexible members that are each routed along a respective one of said grill legs, said flexible members having respective inner ends connected to said grill and having respective outer ends connected together.

21. A portable, adjustable grill apparatus for cooking over a source of heat, said grill apparatus comprising:

at least three grill legs having respective upper ends and lower ends, said grill legs being interconnected at said upper ends by a central hub and angularly spaced relative to each other about said central hub, and said lower ends being adapted to rest on the ground, said grill legs further including respective upper leg portions and lower leg portions, wherein said upper leg portions have respective generally horizontal segments that extend radially from said central hub to respective outer ends, wherein said upper leg portions also have respective generally vertical segments that extend downwardly from respective outer ends of said horizontal segments, wherein said lower leg portions extend generally vertically and have respective upper ends each removably connected to a respective one of said vertical segments, and wherein said lower leg portions have respective lower ends adapted to rest on the ground;

a grill extending generally horizontally and having a perimeter connected to said grill legs for sliding movement therealong; and a height adjusting mechanism for selectively adjusting the height of said grill relative to said legs.

22. A portable, adjustable grill apparatus for cooking over a source of heat, said grill apparatus comprising:

at least three grill legs having respective upper ends and lower ends, said grill legs being interconnected at said upper ends and angularly spaced relative to each other, and said lower ends being adapted to rest on the ground, said grill legs including respective interior passages;

a grill extending generally horizontally and having a perimeter connected to said grill legs for sliding movement therealong; and a height adjusting mechanism for selectively adjusting the height of said grill relative to said legs, said height adjusting mechanism including a plurality of flexible members that are each routed inside said interior passage of a respective one of said grill legs, said flexible members having respective inner ends connected to said grill.

23. A grill apparatus according to claim 22, wherein said flexible members have respective outer ends, and further comprising a securing device connected to said outer ends of said flexible members for securing said outer ends to one of said legs at selected securing points therealong to secure said grill at a selected height relative to said grill legs.

* * * * *